(12) United States Patent
Menheere et al.

(10) Patent No.: US 9,347,373 B2
(45) Date of Patent: May 24, 2016

(54) GAS TURBINE ENGINE WITH TRANSMISSION

(71) Applicant: Pratt & Whitney Canada Corp., Longueuil (CA)

(72) Inventors: David Menheere, Norval (CA); Richard Kostka, Bolton (CA); Jean Dubreuil, Boucherville (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 335 days.

(21) Appl. No.: 14/133,919

(22) Filed: Dec. 19, 2013

(65) Prior Publication Data

US 2015/0176486 A1 Jun. 25, 2015

(51) Int. Cl.
| | |
|---|---|
| *F02C 3/113* | (2006.01) |
| *F16H 3/72* | (2006.01) |
| *F02C 7/36* | (2006.01) |
| *F02C 3/107* | (2006.01) |
| *F16H 57/08* | (2006.01) |

(52) U.S. Cl.
CPC ............... *F02C 3/113* (2013.01); *F02C 3/107* (2013.01); *F02C 7/36* (2013.01); *F16H 3/72* (2013.01); *F05D 2260/40311* (2013.01); *F16H 57/082* (2013.01)

(58) Field of Classification Search
CPC ............ F02C 7/36; F02C 3/113; F02C 3/107; F02C 57/082
See application file for complete search history.

(56) References Cited

U.S. PATENT DOCUMENTS

| | | | |
|---|---|---|---|
| 2,693,080 A | 11/1954 | Hutchinson | |
| 3,632,222 A | 1/1972 | Cronstedt | |
| 3,729,957 A | 5/1973 | Petrie et al. | |
| 3,853,432 A | 12/1974 | Cronstedt | |
| 4,251,987 A | 2/1981 | Adamson | |
| 4,936,748 A * | 6/1990 | Adamson | F02C 6/206 416/123 |
| 5,103,631 A * | 4/1992 | Edwards | F02C 3/107 60/39.163 |
| 6,158,210 A | 12/2000 | Orlando | |
| 7,168,913 B2 * | 1/2007 | Lardellier | F02C 7/32 415/122.1 |
| 7,561,956 B2 | 7/2009 | Ehlers et al. | |
| 7,656,054 B2 * | 2/2010 | Lardellier | F02C 7/32 290/40 C |
| 7,690,185 B2 * | 4/2010 | Linet | F02C 3/113 60/39.163 |
| 7,758,302 B2 * | 7/2010 | Linet | F02C 7/36 415/124.1 |
| 7,832,193 B2 | 11/2010 | Orlando et al. | |
| 7,950,220 B2 | 5/2011 | Merry et al. | |
| 2013/0000323 A1 | 1/2013 | Kupratis | |
| 2014/0290265 A1* | 10/2014 | Ullyott | F02C 7/36 60/773 |

* cited by examiner

*Primary Examiner* — Derek D Knight
(74) *Attorney, Agent, or Firm* — Norton Rose Fulbright Canada (57) ABSTRACT

A gas turbine engine with a transmission having a variable ratio is discussed. A first gear train is in driving engagement with the low pressure spool and has a first output gear. A second gear train is in driving engagement with the high pressure spool and has a second output gear spaced apart from the first output gear. A third gear train defines a driving engagement between the low pressure spool and the low pressure compressor rotor with a variable transmission ratio. A fourth gear train is in driving engagement with the first and second output gears, and in driving engagement with the third gear train to determine the transmission ratio. A method of adjusting a speed of a low pressure compressor rotor of a gas turbine engine is also discussed.

20 Claims, 6 Drawing Sheets

GAS TURBINE ENGINE WITH TRANSMISSION

TECHNICAL FIELD

The application relates generally to gas turbine engines and, more particularly, to a gas turbine engine having a transmission.

BACKGROUND OF THE ART

In gas turbine engines, the low pressure or booster compressor rotor(s) are typically driven by the low pressure spool either by direct connection thereto such that they rotate at a same rotational speed, or through a fixed ratio gearbox. However, the speed of the low pressure spool is usually determined by the load requirements of the engine, whether the load includes a fan, an output shaft, a propeller, or any other adequate type of rotatable load. In particular for turboprop, turboshaft or APU engines, the rotatable load may be required to rotate at a constant or approximately constant rotational speed throughout a range of power demands.

In addition, because power demands on the engine vary, for example between take-off and cruise conditions, the turbine and compressor rotors of the core section typically have to rotate at a relatively large range of rotational speeds. For example, low power requirement conditions may require the rotors of the core section to rotate relatively far below their optimal rotational speed. This in turn may affect the rotational speed of the low pressure turbine rotor(s), and as such of the low pressure spool and associated low pressure compressor rotor(s), which may limit the engine's efficiency in such conditions.

SUMMARY

In one aspect, there is provided a gas turbine engine comprising: a core engine having a rotatable high pressure spool; a low pressure spool rotatable independently of the high pressure spool; a low pressure compressor rotor located upstream of the core engine; and a transmission having a variable transmission ratio and including: a first gear train in driving engagement with the low pressure spool and having a first output gear, a second gear train in driving engagement with the high pressure spool and having a second output gear spaced apart from the first output gear, a third gear train defining a driving engagement between the low pressure spool and the low pressure compressor rotor, a ratio between rotational speeds of the low pressure spool and of the low pressure compressor rotor defining the variable transmission ratio, and a fourth gear train in driving engagement with the first and second output gears, the fourth gear train being in driving engagement with the third gear train and determining the transmission ratio.

In another aspect, there is provided a gas turbine engine comprising: a core engine having a rotatable high pressure spool; a low pressure spool rotatable independently of the high pressure spool; a low pressure compressor rotor located upstream of the core engine; and a transmission having a variable transmission ratio and including: a control gear rotationally supported on a rotatable control ring, with rotational axes of the control gear and of the control ring being perpendicular to one another, a first rotatable ring gear meshed with the control gear and in driving engagement with the low pressure spool, a second rotatable ring gear meshed with the control gear and in driving engagement with the high pressure spool, and a gear train having an input gear in driving engagement with the low pressure spool and an output gear in driving engagement with the low pressure compressor rotor, the control ring being in driving engagement with at least one gear of the gear train.

In a further aspect, there is provided a method of adjusting a speed of a low pressure compressor rotor of a gas turbine engine having low and high pressure spools free to rotate independently from one another, the method comprising: rotating the low pressure spool at a first rotational speed; driving a rotation of the low pressure compressor rotor with the low pressure spool through a first portion of a transmission such that the low pressure compressor rotor rotates at a second rotational speed, the first portion defining a variable ratio between the first and second rotational speeds; rotating the high pressure spool at a third rotational speed; and adjusting the variable ratio through a driving engagement of a second portion of the transmission with the first portion, the second portion being drivingly engaged with the low and high pressure spools such that the variable ratio is adjusted based on a difference between the first and third rotational speeds.

DESCRIPTION OF THE DRAWINGS

Reference is now made to the accompanying figures in which.

DETAILED DESCRIPTION

Figure 1:
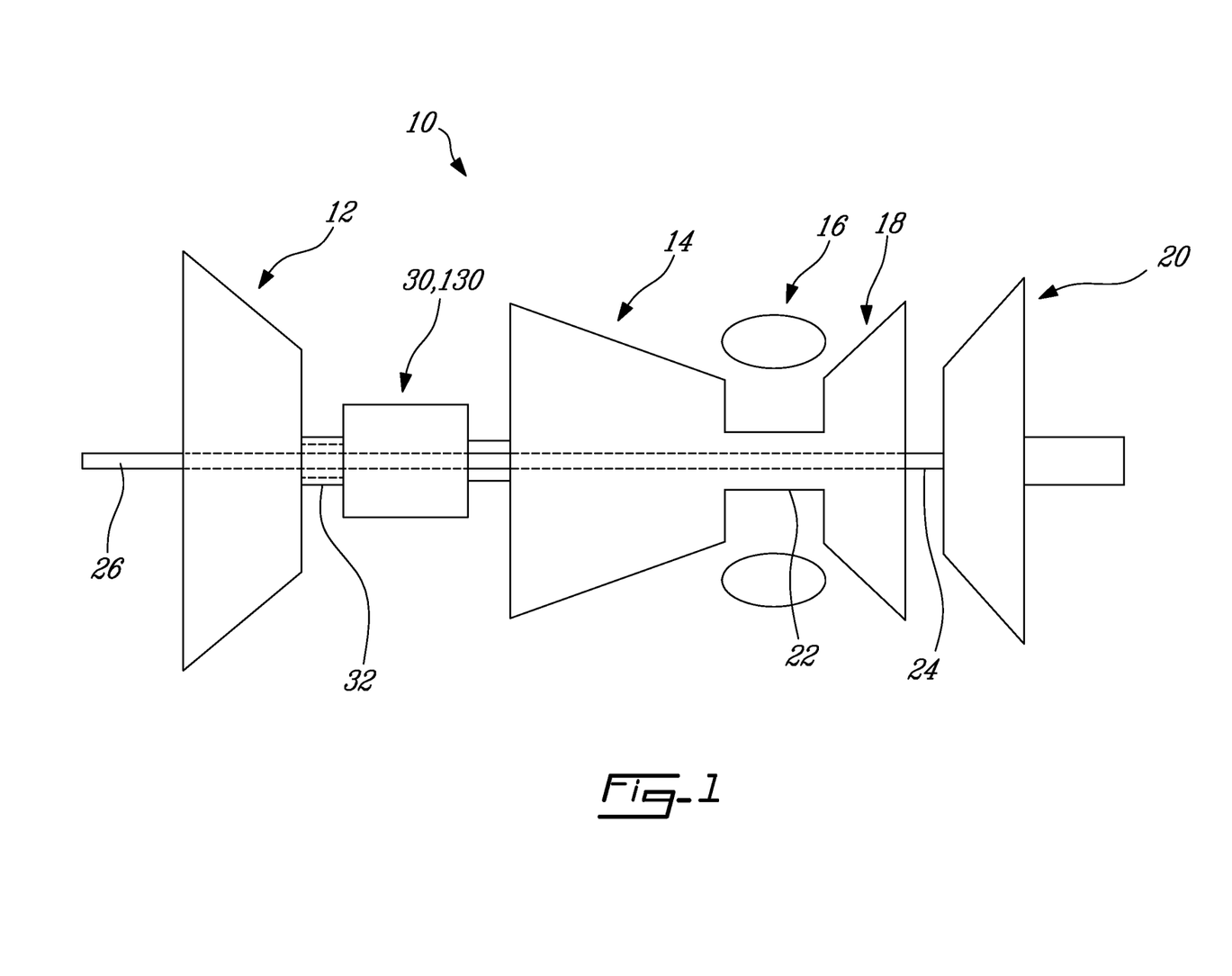
FIG. 1 is a schematic cross-sectional view of a gas turbine engine having a transmission in accordance with a particular embodiment.

FIG. 1 schematically illustrates a gas turbine engine 10, generally comprising in serial flow communication a low pressure compressor section 12 and a high pressure compressor section 14 for pressurizing the air, a combustor 16 in which the compressed air is mixed with fuel and ignited for generating an annular stream of hot combustion gases, a high pressure turbine section 18 for extracting energy from the combustion gases and driving the high pressure compressor section 14, and a low pressure turbine section 20 for further extracting energy from the combustion gases and driving at least the low pressure compressor section 12.

The engine 10 includes a high pressure shaft or spool 22 interconnecting the rotors of the high pressure turbine and compressor sections 18, 14, and a low pressure or power shaft or spool 24 driven by the rotor(s) of the low pressure turbine section 20. The high pressure portion of the engine 10 may be referred to as a core engine, with the low pressure compressor section 12 being located upstream thereof, and the low pressure turbine section 20 being located downstream thereof.

In a particular embodiment, the high pressure spool 22 is hollow and the low pressure spool 24 extends therethrough. The two spools 22, 24 are free to rotate independently from one another. The engine 10 further includes a variable transmission 30, 130 driving the rotor(s) of the low pressure compressor section 12 based on a speed difference between the two spools 22, 24, as will be further detailed below.

The engine 10 schematically illustrated in FIG. 1 can be any type of gas turbine engine. In a particular embodiment shown in FIG. 2, the gas turbine engine 10 is a turboshaft engine. The high pressure compressor section 14 includes at least one high pressure compressor rotor 114 drivingly engaged to the high pressure spool 22. The high pressure turbine section 18 includes at least one turbine rotor 118 also drivingly engaged to the high pressure spool 22. In the particular embodiment shown, the high pressure compressor and turbine rotors 114, 118 are directly engaged to the high pressure spool 22, so that they rotate at a same speed.

Figure 2:
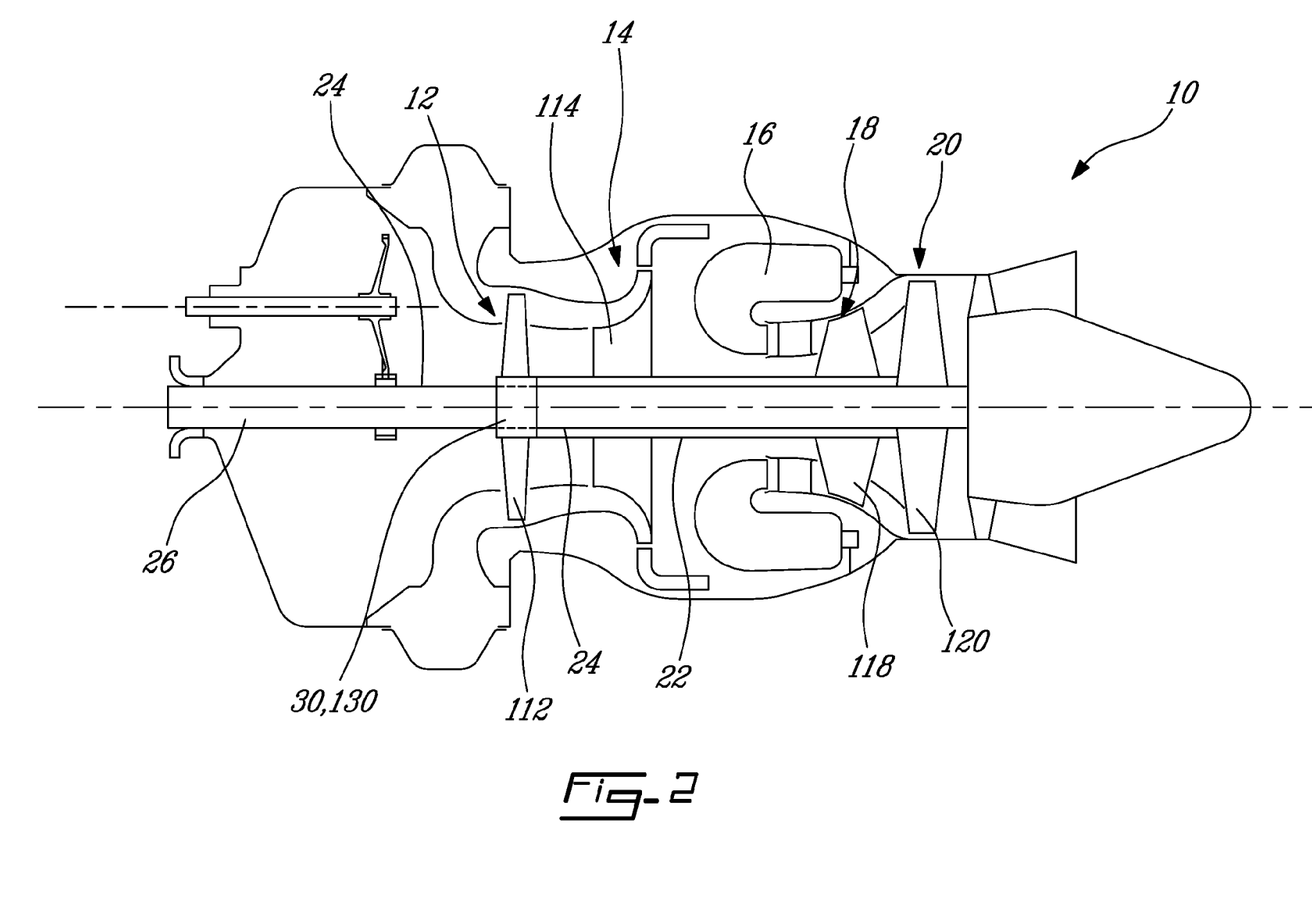
FIG. 2 is a schematic cross sectional view of an exemplary gas turbine engine such as that shown in FIG. 1.

The low pressure turbine 20 includes at least one low pressure turbine rotor 120 drivingly engaged to the low pressure spool 24, and in a particular embodiment directly engaged thereto so as to rotate at the same speed. The engine 10 further includes an output shaft 26, which in a particular embodiment is an extension of the low pressure spool 24 extending through the transmission 30.

The low pressure compressor 12 includes at least one low pressure compressor rotor 112 drivingly engaged to the transmission 30, 130. The transmission 30, 130 is drivingly engaged to the low pressure spool 24, and is also engaged to the high pressure spool 22 such that the ratio of the transmission 30, 130 is controlled by a speed difference between the two spools 22, 24 without the need for additional input. Accordingly, in a particular embodiment, the transmission 30, 130 allows to automatically vary the speed of the low pressure compressor rotor 112 (e.g. compressor boost stage) in response to load variation.

Figure 3:
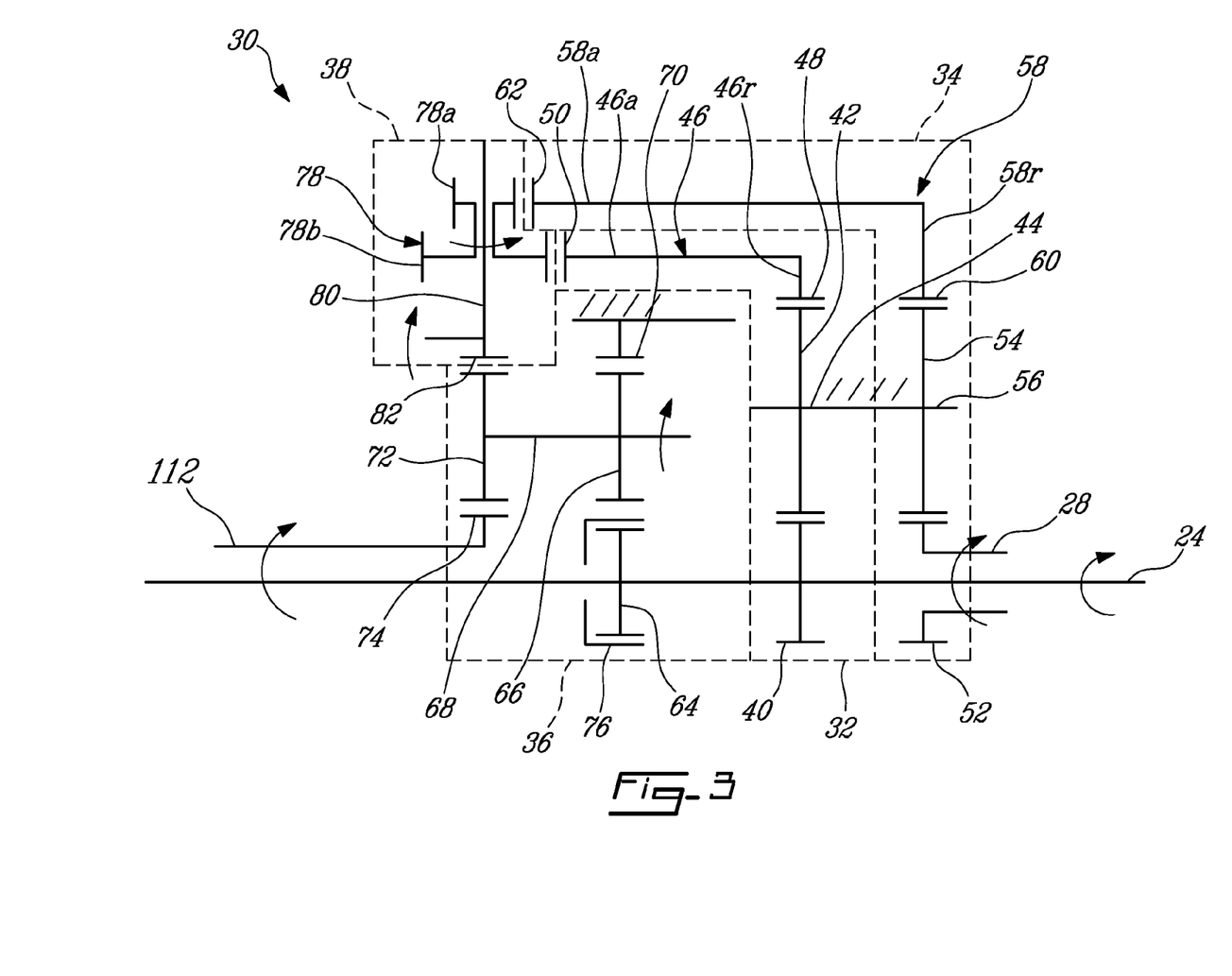
FIG. 3 is a schematic diagram of a transmission in accordance with a particular embodiment, which may be used in a gas turbine engine such as shown in FIG. 2.
Figure 4:
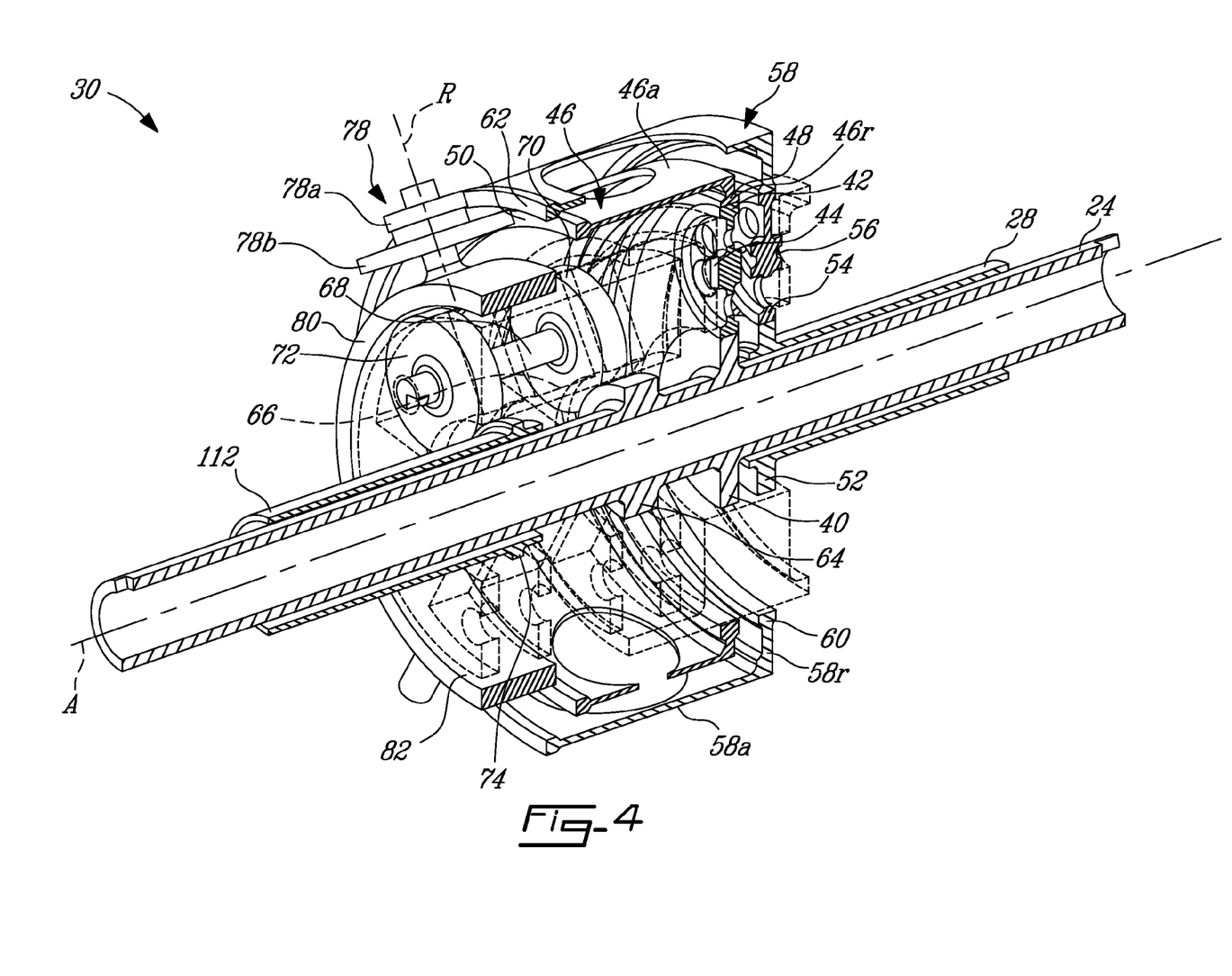
FIG. 4 is a schematic tridimensional cross-sectional view of the transmission of FIG. 3.

Referring to FIGS. 3-4, a particular embodiment for the transmission 30 is shown. As illustrated in FIG. 3, the transmission 30 can be generally described as defining four gear trains: a first gear train 32 driven by the low pressure spool 24, a second gear train 34 driven by the high pressure spool 22 (in the embodiment shown by being driven by the shaft 28 of the high pressure compressor rotor 114 which rotates with the high pressure spool 22), a third gear train 36 defining a driving connection between the low pressure spool 24 and the low pressure compressor rotor 112, and a fourth gear train 38 driven by the speed difference between the high and low pressure spools 22, 24 through driving engagement with the first and second gear trains 32, 34, and affecting the transmission ratio of the third gear train 36 through driving engagement therewith.

In the embodiment shown in FIGS. 3-4, the first gear train 32 is a planetary gear train. A first input gear 40 is in driving engagement with the low pressure spool 24, shown here has a sun gear directly connected (e.g. monolithic therewith or machined separately and mechanically linked thereto) to the low pressure spool 24. Alternately, and depending on the configuration of the engine 10, the first input gear 40 may be connected to any other structure rotating together with the low pressure spool 24.

A plurality of planet gears 42 are supported by a fixed carrier 44, and are meshed with the first input sun gear 40 to rotate therearound. A rotatable ring 46 defines an inner ring gear 48 surrounding the planet gears 42 and meshed therewith. The rotatable ring 46 has an L-shaped profile, with an axial portion 46a extending along the axial direction, and a radial portion 46r extending radially inwardly from the axial portion 46a along the radial direction. The inner ring gear 48 is defined at the free end of the radial portion 46r. A first output gear 50 is provided in the form of a face ring gear defined at the free end of the axial portion 46a of the rotatable ring 46. The first output gear 50 is thus rotated by the low pressure spool 24 through the other gears and elements of the first gear train 32.

In the embodiment shown, the second gear train 34 is also a planetary gear train. A second input gear 52 is in driving engagement with the high pressure spool 22, shown here has a sun gear directly connected (e.g. monolithic therewith or machined separately and mechanically linked thereto) to the shaft 28 of the high pressure compressor rotor 114 which is directly driven by the high pressure spool 22. Alternately, and depending on the configuration of the engine 10, the second input gear 52 may be directly connected to the high pressure spool 22, or to any other structure rotating together with the high pressure spool 22.

A plurality of planet gears 54 are supported by a fixed carrier 56, which may form a common structure with the fixed carrier 44 of the first gear train 32. The planet gears 54 are meshed with the second input sun gear 52 to rotate therearound. A rotatable ring 58 defines an inner ring gear 60 surrounding the planet gears 54 and meshed therewith. In the embodiment shown, the rotatable ring 46 of the first gear train 32 is received radially inwardly of the rotatable ring 58 of the second gear train 34. The rotatable ring 58 also has an L-shaped profile, with an axial portion 58a extending along the axial direction, and a radial portion 58r extending radially inwardly from the axial portion 58a along the radial direction. The inner ring gear 60 is defined at the free end of the radial portion 58r. A second output gear 62 is provided in the form of a face ring gear defined at the free end of the axial portion 58r of the rotatable ring 58. The second output gear 62 is thus rotated by the high pressure spool 22 through the other gears and elements of the second gear train 34.

In the embodiment shown, the third gear train 36 is also a planetary gear train. A third input gear 64 is in driving engagement with the low pressure spool 24, shown here has a sun gear directly connected (e.g. monolithic therewith or machined separately and mechanically linked thereto) to the low pressure spool 24. Alternately, and depending on the configuration of the engine 10, the third input gear 64 may be connected to any other structure rotating together with the low pressure spool 24. In this embodiment, the first and third input sun gears 40, 64 are separate gears connected to the low pressure spool 24 at different locations.

A set of input planet gears 66 are supported by a rotatable carrier 68, and are meshed with the third input sun gear 64 to rotate therearound. A fixed inner ring gear 70 surrounds the input planet gears 66 and is meshed therewith. The fixed ring gear 70 may form a common structure with the fixed carrier 44 of the first gear train 32 and/or with the fixed carrier 56 of the second gear train 34. A set of output planet gears 72 is supported by the same rotatable carrier 68, with the two sets of planet gears 66, 72 being rotatable independently of one another. A third output gear 74 is provided in the form of a sun gear directly connected (e.g. monolithic therewith or machined separately and mechanically linked thereto) to the shaft of the low pressure compressor rotor 112. The third output gear 74 is meshed with the output planet gears 72 which rotate therearound. The third gear train 36 thus transfers power between the low pressure spool 24 and the low pressure compressor rotor 112, and the ratio between the rotational speed of the third output gear 74 (rotating with the low pressure compressor rotor 112) and the rotational speed of the third input gear 64 (rotating with the low pressure spool 24) defines the transmission ratio of the transmission 30.

In a particular embodiment, a clutch 76, which may be for example a sprag clutch, may be provided to selectively engage and disengage the third input sun gear 64 and the input planet gears 66 of the third gear train 36, for example to be able to disconnect the drive between the low pressure spool 24 and the low pressure compressor rotor 112 during start-up of the engine 10, allowing the low pressure compressor rotor 112 to be driven by the airflow through the core engine. Alternately, the clutch 76 may be omitted.

In the embodiment shown, the fourth or control gear train 38 includes a fourth input or control gear 78 rotationally supported by a rotatable control ring 80. The control gear 78 is rotatable about a radially extending axis R, and the control ring 80 is rotatable about an axially extending axis A (also corresponding to the rotational axis of the spools 22, 24 and accordingly of the sun gears, rotatable carriers and ring gears of the first, second and third gear trains 32, 34, 36), such that the two axes A, R are perpendicular to one another.

The control gear 78 is meshed with the output gears 50, 62 of the first and second gear trains 32, 34. In the embodiment shown, the control gear 78 is a stepped gear including two interconnected gears 78a, 78b having different sizes and rotating together. The smaller gear 78a is located radially outwardly of the larger gear 78b, and is meshed with the output gear 62 of the second gear train 34, which is rotated by the high pressure spool 22. The larger gear 78b is meshed with the output gear 50 of the first gear train 32, which is rotated by the low pressure spool 24. Accordingly, the rotation of the control gear 78 and control ring 80 is determined by a difference in the rotational speeds of the high and low pressure spools 22, 24.

The control ring 80 surrounds the output planet gears 72 of the third gear train 36, and defines an inner ring gear 82 meshed therewith. The fourth gear train 38 is thus in driving engagement with the third gear train 36 through the meshed engagement between the inner ring gear 82 of the control ring 80 and the output planet gears 72 of the third gear train 36. The input of the fourth gear train 38 on the third gear train 36 automatically controls the transmission ratio of the transmission 30 based on the difference in the rotational speeds of the high and low pressure spools 22, 24, which determines the rotational speed of the control ring 80.

In a particular embodiment, the gears are relatively sized such that at a predetermined speed ratio between the high and low pressure spools 22, 24, the control ring 80 does not rotate. Accordingly, if the low pressure spool 24 remains at constant speed (e.g. turboprop engine), any change in rotational speed of the high pressure spool 22 from that point, for example in response to a throttle adjustment from the pilot or ECU, results in rotation of the control ring 80, in one direction for a speed increase and in the other for a speed reduction. The direction of rotation of the control ring 80 results in a change in speed of the low pressure compressor rotor 112 (e.g. booster compressor rotor). An increase in the rotational speed of the high pressure spool 22 (acceleration) results in an increase in rotational speed of the low pressure compressor rotor 112, and accordingly a corresponding increase in air flow to the high pressure compressor 14 when it is required. A decrease in the rotational speed of the high pressure spool 22 (deceleration) has the opposite effect. The load variation may also cause a change in rotational speed of the low pressure spool 24, which will also be reflected in a variation in the rotational speed of the low pressure compressor rotor 112.

For example, in a particular embodiment, the gear ratio between the two gears 78a,b of the stepped control gear 78 is 1:2. Accordingly, when the rotational speed ratio between the high pressure spool 22 and low pressure spool 24 is 2:1, the control ring 80 does not rotate. A rotational speed ratio between the high and low pressure spools 22, 24 different from 2:1 causes rotation of the control ring 80 and accordingly, an increase or decrease of the rotational speed of the low pressure compressor rotor 112, as driven by the low pressure spool 24.

Figure 5:
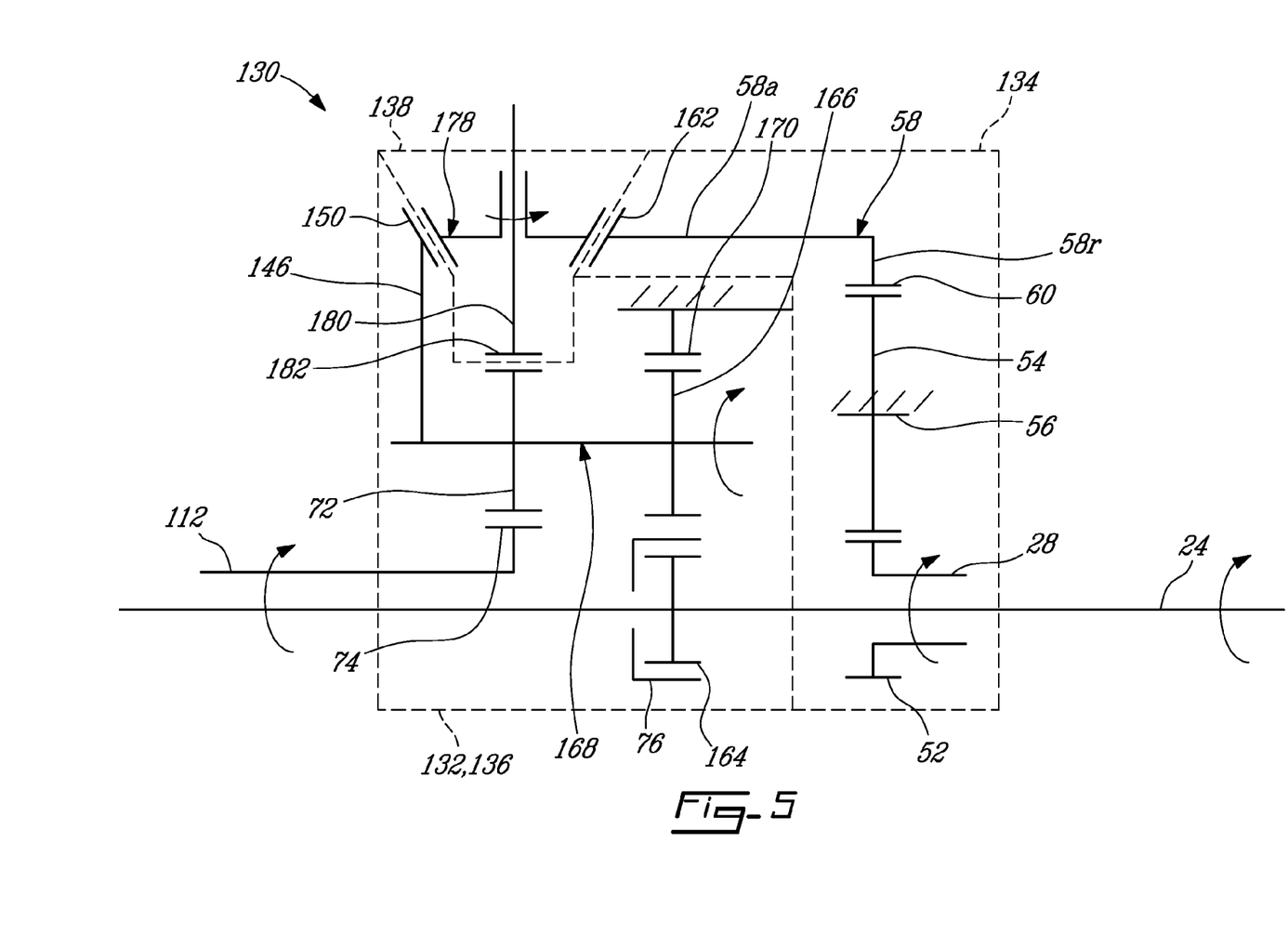
FIG. 5 is a schematic diagram of a transmission in accordance with another particular embodiment, which may be used in a gas turbine engine such as shown in FIG. 2.
Figure 6:
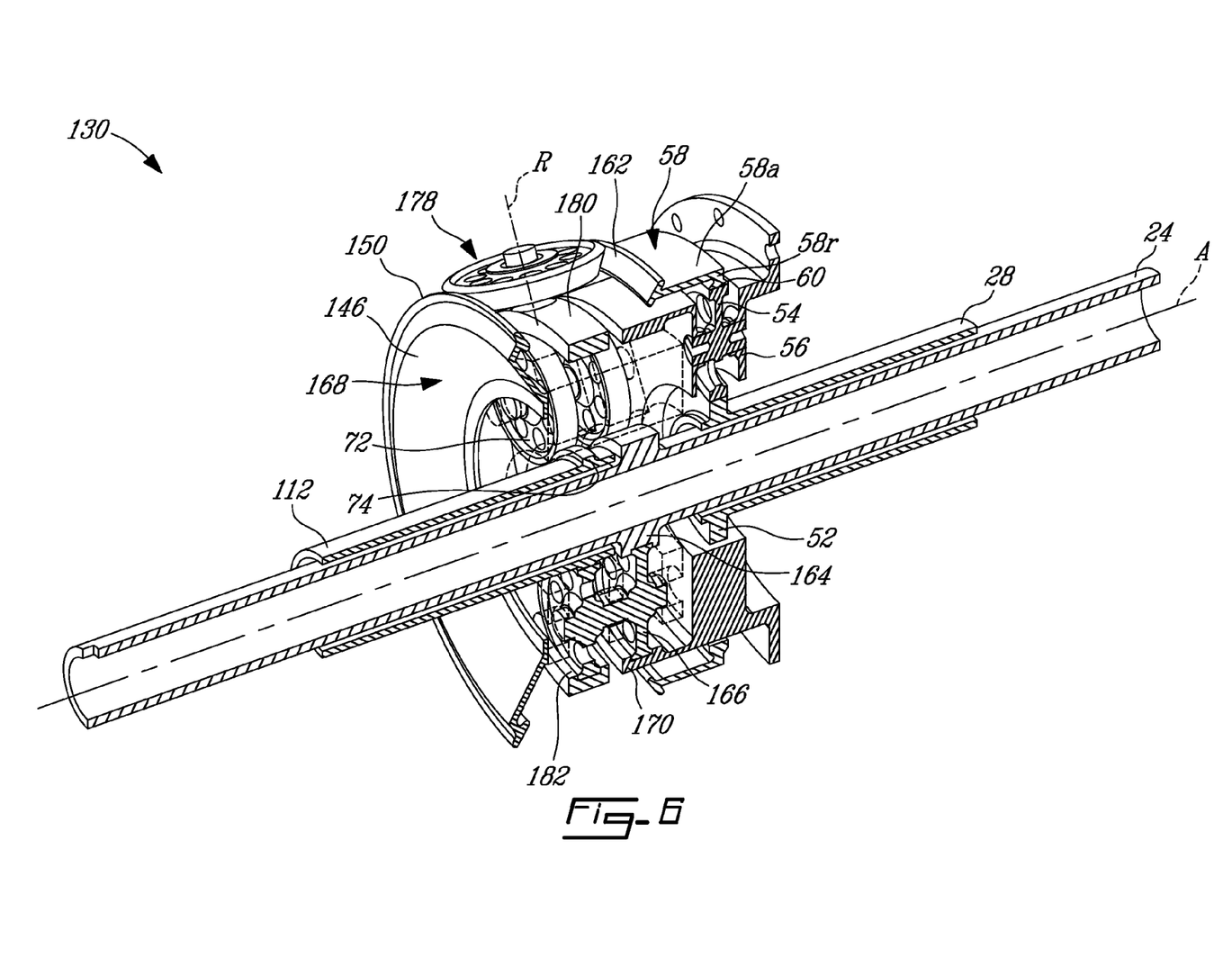
FIG. 6 is a schematic tridimensional cross-sectional view of the transmission of FIG. 5.

Referring to FIGS. 5-6, another particular embodiment for the transmission 130 is shown. The transmission 130 also includes a first gear train 132 driven by the low pressure spool 24, a second gear train 134 driven by the high pressure spool 22 (for example through the high pressure compressor rotor shaft 28), a third gear train 136 defining a driving connection between the low pressure spool 24 and the low pressure compressor rotor 112, and a fourth gear train 138 driven by the speed difference between the high and low pressure spools 22, 24 through driving engagement with the first and second gear trains 132, 134, and affecting the transmission ratio of the third gear train 136 through driving engagement therewith. However, in this embodiment, the first and third gear trains 132, 136 have common elements.

In this embodiment, the first gear train 132 is a planetary gear train with a different configuration than that of the previously described first gear train 32. In this embodiment, the input gear of the first gear train is the same as the input gear of the third gear train, i.e. a single input sun gear 164 is provided in connection with the low pressure spool 24. The first gear train 132 has common elements with the third gear train 136, namely the set of input planet gears 166 supported by the rotatable carrier 168 and meshed with the common input sun gear 164, and the fixed inner ring gear 170 surrounding the input planet gears 166 and meshed therewith. The rotatable carrier 168 includes a ring portion 146 extending therefrom, and the output gear 150 of the first gear train 132 is defined as a bevel ring gear at the free end of the ring portion 146 of the rotatable carrier 168.

The second and third gear trains 134, 136 (with optional clutch) are otherwise similar to the previously described second and third gear trains 34, 36, and accordingly will not be described again herein. Identical reference numerals are used to identify similar elements. In the second gear train 134, the output gear 162, defined at the free end of the axial portion 58a of the rotatable ring 58 and rotated by the high pressure spool 22, is defined as a bevel ring gear.

In this embodiment, the control gear 178 of the fourth gear train 138, which is rotationally supported by a rotatable control ring 180 with the control gear 178 and control ring 180 rotating about perpendicular axes R, A, is provided as a single bevel gear. The single control gear 178 is located between and meshed with the first and second output bevel gears 150, 162. As in the previous embodiment, the rotation of the control gear 178 and control ring 180 is determined by a difference in the rotational speeds of the high and low pressure spools 22, 24, and the control ring 180 defines an inner ring gear 182 surrounding and meshed with the output planet gears 72 of the third gear train 136. The input of the fourth gear train 138 on the third gear train 136 automatically controls the transmission ratio of the transmission 130 based on the difference in the rotational speeds of the high and low pressure spools 22, 24.

As in the previous embodiment, the gears may be relatively sized such that at a predetermined speed ratio between the high and low pressure spools 22, 24 (e.g. 2:1), the rotatable control ring 180 does not rotate, so that with a constant speed of the low pressure spool 24, any change in rotational speed of the high pressure spool 22 from that point results in rotation of the control ring 180 and change in speed of the low pressure compressor rotor 112.

In use, the speed of the low pressure compressor rotor 112 is thus adjusted by driving its rotation with the low pressure spool 24 through a first portion of the transmission 30, 130, and adjusting the variable ratio between the rotational speeds of the low pressure compressor rotor 112 and of the low pressure spool 24 through a driving engagement of a second portion of the transmission 30, 130 with the first portion. The second portion is drivingly engaged with the high and low pressure spools 22, 24 such that the ratio is adjusted based on a difference between the rotational speeds of the high and low pressure spools 22, 24.

In the embodiments shown, the rotation of the low pressure compressor rotor 112 is driven by the low pressure spool 24 through the third gear train 36, 136 of the transmission 30, 130, and the second portion includes the other gear trains. The second portion is drivingly engaged with the low pressure spool 24 through the first gear train 32, 132, with the high pressure spool 22 through the second gear train 34, 134, and with the third gear train 36, 136 through the fourth gear train 38, 138.

In a particular embodiment, control of the transmission ratio between the low pressure compressor rotor 112 and the low pressure spool 24 can thus be achieved with the transmission 30, 130 without the need for any outside controls and/or actuation devices; a relatively wide range in rotational speed variation can be generated though appropriate sizing of the gear ratios in the transmission 30, 130.

Although the engine 10 has been shown as a turboshaft engine, it is understood that the transmission 30, 130 may alternately be used in other types of engines, including turboprop engines, and turbofan engines where the low pressure compressor rotor may include a fan rotor.

The above description is meant to be exemplary only, and one skilled in the art will recognize that changes may be made to the embodiments described without departing from the scope of the invention disclosed. For example, some gear trains may be partially or completely defined by gears and elements forming part of another gear train. The engine may have more than two independently rotatable spools. Other modifications which fall within the scope of the present invention will be apparent to those skilled in the art, in light of a review of this disclosure, and such modifications are intended to fall within the appended claims.

The invention claimed is:

1. A gas turbine engine comprising:
   a core engine having a rotatable high pressure spool;
   a low pressure spool rotatable independently of the high pressure spool;
   a low pressure compressor rotor located upstream of the core engine; and
   a transmission having a variable transmission ratio and including:
      a first gear train in driving engagement with the low pressure spool and having a first output gear,
      a second gear train in driving engagement with the high pressure spool and having a second output gear spaced apart from the first output gear,
      a third gear train defining a driving engagement between the low pressure spool and the low pressure compressor rotor, a ratio between rotational speeds of the low pressure spool and of the low pressure compressor rotor defining the variable transmission ratio, and
      a fourth gear train in driving engagement with the first and second output gears, the fourth gear train being in driving engagement with the third gear train and determining the transmission ratio.

2. The engine as defined in claim 1, wherein the first gear train includes an input sun gear connected to the low pressure spool, a plurality of planet gears meshed with the sun gear and retained by a fixed carrier, and a rotatable ring defining a first ring gear meshed with the planet gears, the first output gear being defined as a second ring gear forming part of the rotatable ring and spaced apart from the first ring gear.

3. The engine as defined in claim 1, wherein the second gear train includes an input sun gear connected to a shaft rotating with the high pressure spool, a plurality of planet gears meshed with the sun gear and retained by a fixed carrier, and a rotatable ring defining a first ring gear meshed with the planet gears, the second output gear being defined as a second ring gear forming part of the rotatable ring and spaced apart from the first ring gear.

4. The engine as defined in claim 1, wherein the third gear train includes an input sun gear connected to the low pressure spool, a first plurality of planet gears meshed with the input sun gear and retained by a rotatable carrier, a fixed ring gear meshed with the first plurality of planet gears, a second plurality of planet gears supported by the rotatable carrier and rotatable independently of the first plurality of planet gears, and an output sun gear connected to a shaft of the low pressure compressor rotor and meshed with the second plurality of planet gears.

5. The engine as defined in claim 4, further comprising a clutch operable to selectively allow and prevent the meshed engagement between the first plurality of planet gears and the input sun gear.

6. The engine as defined in claim 4, wherein the first gear train includes the input sun gear connected to the low pressure spool, the first plurality of planet gears meshed with the input sun gear and retained by the rotatable carrier, and the fixed ring gear meshed with the first plurality of planet gears, the first output gear being defined as a ring gear forming part of the rotatable carrier.

7. The engine as defined in claim 1, wherein the fourth gear train includes a control gear meshed with the first and second output gears and a rotatable ring supporting the control gear, the control gear and rotatable ring being rotatable about perpendicular axes, the rotatable ring being in driving engagement with the third gear train intermediate an input gear and an output gear thereof.

8. The engine as defined in claim 4, wherein the fourth gear train includes a control gear meshed with the first and second output gears and a rotatable ring supporting the control gear, the control gear and rotatable ring being rotatable about perpendicular axes, the rotatable ring defining a ring gear meshed with the second plurality of planet gears.

9. The engine as defined in claim 7, wherein the control gear is a stepped gear including two interconnected gears having different sizes, the first and second output gears being meshed with different ones of the interconnected gears.

10. The engine as defined in claim 7, wherein the control gear is a single gear received between and in meshed engagement with the first and second output gears.

11. A gas turbine engine comprising:
   a core engine having a rotatable high pressure spool;
   a low pressure spool rotatable independently of the high pressure spool;
   a low pressure compressor rotor located upstream of the core engine; and
   a transmission having a variable transmission ratio and including:
      a control gear rotationally supported on a rotatable control ring, with rotational axes of the control gear and of the control ring being perpendicular to one another,
      a first rotatable ring gear meshed with the control gear and in driving engagement with the low pressure spool, a second rotatable ring gear meshed with the control gear and in driving engagement with the high pressure spool, and a gear train having an input gear in driving engagement with the low pressure spool and an output gear in driving engagement with the low pressure compressor rotor, the control ring being in driving engagement with at least one gear of the gear train.

12. The engine as defined in claim 11, further comprising a clutch operable to selectively engage and disengage the input gear from a remainder of the gear train.

13. The engine as defined in claim 11, wherein the first rotatable ring gear is meshed with a plurality of planet gears retained by a fixed carrier, the planet gears being meshed with a sun gear connected to the low pressure spool.

14. The engine as defined in claim 11, wherein the second rotatable ring gear is meshed with a plurality of planet gears retained by a fixed carrier, the planet gears being meshed with a sun gear connected to a shaft driven by the high pressure spool.

15. The engine as defined in claim 11, wherein the input gear of the gear train is a sun gear connected to the low pressure spool, the gear train including a first plurality of planet gears meshed with the sun gear and retained by a rotatable carrier, a fixed ring gear meshed with the first plurality of planet gears, and a second plurality of planet gears supported by the rotatable carrier and meshed with a control ring gear forming part of the control ring, the output gear of the gear train being a sun gear connected to a shaft of the low pressure compressor rotor and meshed with the second plurality of planet gears.

16. The engine as defined in claim 15, wherein the first rotatable ring gear is defined as part of the rotatable carrier and is in driving engagement with the low pressure spool through the meshed engagement of the first plurality of planet gears with the sun gear connected to the low pressure spool.

17. The engine as defined in claim 11, wherein the control gear is a single gear received between and in meshed engagement with the first and second rotatable ring gears.

18. The engine as defined in claim 11, wherein the control gear including two interconnected gears having different sizes, the first and second rotatable ring gears being each meshed with a respective one of the interconnected gears.

19. A method of adjusting a speed of a low pressure compressor rotor of a gas turbine engine having low and high pressure spools free to rotate independently from one another, the method comprising:

rotating the low pressure spool at a first rotational speed;

driving a rotation of the low pressure compressor rotor with the low pressure spool through a first portion of a transmission such that the low pressure compressor rotor rotates at a second rotational speed, the first portion defining a variable ratio between the first and second rotational speeds;

rotating the high pressure spool at a third rotational speed; and adjusting the variable ratio through a driving engagement of a second portion of the transmission with the first portion, the second portion being drivingly engaged with the low and high pressure spools such that the variable ratio is adjusted based on a difference between the first and third rotational speeds.

20. The method as defined in claim 19, wherein adjusting the variable ratio includes rotating a first gear with the low pressure spool, rotating a second gear with the low pressure spool, rotating a control ring and a control gear rotationally supported thereon about perpendicular rotational axes with the first and second gears, and changing a rotational speed of at least one gear of the first portion with the control ring.

* * * * *